(12) United States Patent
Vann (10) Patent No.: US 9,940,104 B2
(45) Date of Patent: Apr. 10, 2018

(54) AUTOMATIC SOURCE CODE GENERATION

(71) Applicant: MICROSOFT TECHNOLOGY LICENSING, LLC., Redmond, WA (US)

(72) Inventor: Daniel Vann, Duvall, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 382 days.

(21) Appl. No.: 13/915,619

(22) Filed: Jun. 11, 2013

(65) Prior Publication Data

US 2014/0365994 A1   Dec. 11, 2014

(51) Int. Cl.
*G06F 9/44*   (2006.01)

(52) U.S. Cl.
CPC . *G06F 8/30* (2013.01); *G06F 8/36* (2013.01)

(58) Field of Classification Search
CPC .... G06F 9/44; G06F 9/44505; G06F 9/45529; G06F 8/30; G06F 8/36
USPC .................................................. 717/100–123
See application file for complete search history.

(56) References Cited

U.S. PATENT DOCUMENTS

| | | | | |
|---|---|---|---|---|
| 5,187,788 | A * | 2/1993 | Marmelstein | G06F 8/34 717/109 |
| 5,499,371 | A * | 3/1996 | Henninger | G06F 8/24 707/999.102 |
| 6,357,039 | B1 * | 3/2002 | Kuper | G06F 8/34 717/106 |
| 6,681,383 | B1 * | 1/2004 | Pastor | G06F 8/30 717/126 |
| 6,684,381 | B1 | 1/2004 | Bening et al. | |
| 7,693,720 | B2 * | 4/2010 | Kennewick | G06F 17/30654 704/257 |
| 7,739,267 | B2 * | 6/2010 | Jin | G06F 17/30563 707/714 |
| 8,375,351 | B2 | 2/2013 | Ahadian et al. | |
| 2008/0281811 | A1 * | 11/2008 | Korst et al. | 707/5 |
| 2008/0295069 | A1 | 11/2008 | Nicholls et al. | |
| 2009/0125546 | A1 * | 5/2009 | Iborra et al. | 707/102 |
| 2009/0217243 | A1 * | 8/2009 | Hashimoto et al. | 717/120 |
| 2009/0228866 | A1 * | 9/2009 | Lochmann | 717/107 |
| 2010/0122234 | A1 * | 5/2010 | Le Bars et al. | 717/106 |
| 2010/0125613 | A1 * | 5/2010 | Wiljanen et al. | 707/803 |
| 2010/0287528 | A1 * | 11/2010 | Lochmann | 717/104 |
| 2011/0082884 | A1 * | 4/2011 | Hollingsworth | G06F 17/30864 707/776 |
| 2011/0302553 | A1 | 12/2011 | Gulwani | |
| 2012/0203756 | A1 | 8/2012 | Biran et al. | |

OTHER PUBLICATIONS

Budinsky, Frank J., et al. "Automatic code generation from design patterns." IBM systems Journal 35.2 (1996): pp. 151-171.*

(Continued)

*Primary Examiner* — Satish Rampuria (57) ABSTRACT

Source code statements are automatically generated from a profile including variable code elements and methods. The profile is built from an existing code base that has identified variable code elements that differ when used in different versions of the source code statements. A developer may define values for the variable code elements which are then used by the methods in the profile to automatically generate corresponding source code statements.

20 Claims, 8 Drawing Sheets

(56) References Cited

OTHER PUBLICATIONS

Mozumdar, Mohammad Mostafizur Rahman, et al. "A framework for modeling, simulation and automatic code generation of sensor network application." Sensor, Mesh and Ad Hoc Communications and Networks, 2008. SECON'08. 5th Annual IEEE Communications Society Conference on. IEEE, 2008. pp. 515-522.*

Vogel-Heuser, Birgit, Daniel Witsch, and Uwe Katzke. "Automatic code generation from a UML model to IEC 61131-3 and system configuration tools." Control and Automation, 2005. ICCA'05. International Conference on. vol. 2. IEEE, 2005. pp. 1034-1039.*

Zafar, Nazir Ahmad, "Automatic Construction of Formal Syntax Tree Based on Regular Expressions", Retrieved at: <<http://www.iaeng.org/publication/WCE2012/WCE2012_pp804-809.pdf>>, In Proceedings of the World Congress on Engineering, vol. II, Jul. 4, 2012, pp. 6.

"The Lex & Yacc Page", Retrieved at:<<http://dinosaur.compilertools.net/>>, Aug. 25, 2001, pp. 3.

"Mapping Rules and Strategies", Retrieved at: <<http://manual.altova.com/mapforce/mapforce-basidindex.html?mffmapping_strategies.htm>>, Retrieved Date: Apr. 26, 2013, pp. 4.

"International Search Report & Written Opinion for PCT Patent Application No. PCT/US2014/040973", dated Aug. 29, 2014, 12 Pages.

"International Preliminary Report on Patentability Issued in PCT Application No. PCT/US2014/040973", dated Sep. 30, 2015, 8 Pages.

\* cited by examiner

Complex Element Profile 300

| | | |
|---|---|---|
| Create Element Rule 302 | | |
| Regular Expression | "Create a" <element type> "named" <element name> | 310 |
| Logical Statements | $element type$ = Capitalize($element type$);<br>Output($element type$ $element name$ = new $element type$()); | 312 |
| Resize Element Rule 304 | | |
| Regular Expression | "Resize" <element name> | 314 |
| Logical Statement | Output($element type$.Resize()); | 316 |
| Move Element Rule 306 | | |
| Regular Expression | "Move" <element name> | 318 |
| Logical Statement | Output($element type$.Move()); | 320 |
| Delete Element Rule 308 | | |
| Regular Expression | "Delete" <element name> | 322 |
| Logical Statement | Output($element type$.Delete()); | 324 |

AUTOMATIC SOURCE CODE GENERATION

BACKGROUND

The generation of source code is a complicated and time consuming process. Normally, a developer creates source code in a programming language and tests it prior to executing the source code in an operational environment. A developer may consume considerable amount of time testing the source code under various conditions in order to ensure that the source code operates an intended. An integrated development environment (IDE) is often used to assist a developer in developing source code in different programming languages. An IDE provides a programmer with a framework that includes tools, such as editors, debuggers, compilers, interpreters, that enable a developer to develop, debug, and test source code in multiple programming languages. However, the capabilities offered by the IDE are those that are more frequently used by developers, such as editing, debugging, and testing. Often, an IDE does not provide the capabilities for customizing existing source code using user input in an easy manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Source code can be automatically generated for source code libraries when the context of the source code differs slightly from an existing code base. In each context, certain elements of the source code may vary. These elements may be modeled as variable code elements that take on different values when used in different contexts. A user may define values for the variable code elements and a system automatically generates a different set of source code statements using these values. In this manner, a developer alleviates the expense in writing, debugging, and testing the new source code.

A profile is associated with a particular context and contains the programmable instructions used to generate the output source code (i.e., source code statements) for that context. A profile may include one or more variable code elements and methods. The variable code elements represent elements of the grammar of a programming language associated with source code statements that change repeatedly in different versions of a software application. The variable code elements may represent variables, object types, variable names, and other constructs in the grammar of the programming language that are used in the output source code. A user may input values of the variable code elements which are then used by the profile's methods to generate the output source code.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments pertain to a technology for automatically generating source code from an existing code base. The existing code base may differ slightly when used in different contexts. The existing code base is analyzed to determine source code statements that remain static when used in different contexts and source code statements that may vary. The source code statements that vary may be modeled as variable code elements. The source code statements associated with the variable code elements may be generated automatically using knowledge of the source code statements in the existing code base. A context defines the programming environment associated with the output source code. The context may be associated with a particular programming language, code libraries, code guidelines, best practices, formatting preferences for the output, or other programs or applications that may be invoked, executed or otherwise used to generate the output.

For each context, a profile is provided that includes one or more variable code elements and one or more methods. A variable code element represents an element in the grammar of a programming language associated with source code statements that change repeatedly in different versions of a software application. A user defines the variable code elements associated with a context and the methods of the profile generate the corresponding source code statements. In this manner, a developer (e.g., user, end user, programmer, etc.) only has to input the values for the variable code elements rather than rewrite the source code for a different context.

For example, in multiple embodiments, the pre-existing code base may be source code libraries representing test cases used to test software applications under different conditions. The source code for each test case may vary slightly. Instead of manually generating the source code for an additional test case, different values for variable code elements may be specified by a developer with the system automatically generating the corresponding source code statements for the additional test case.

Figure 1:
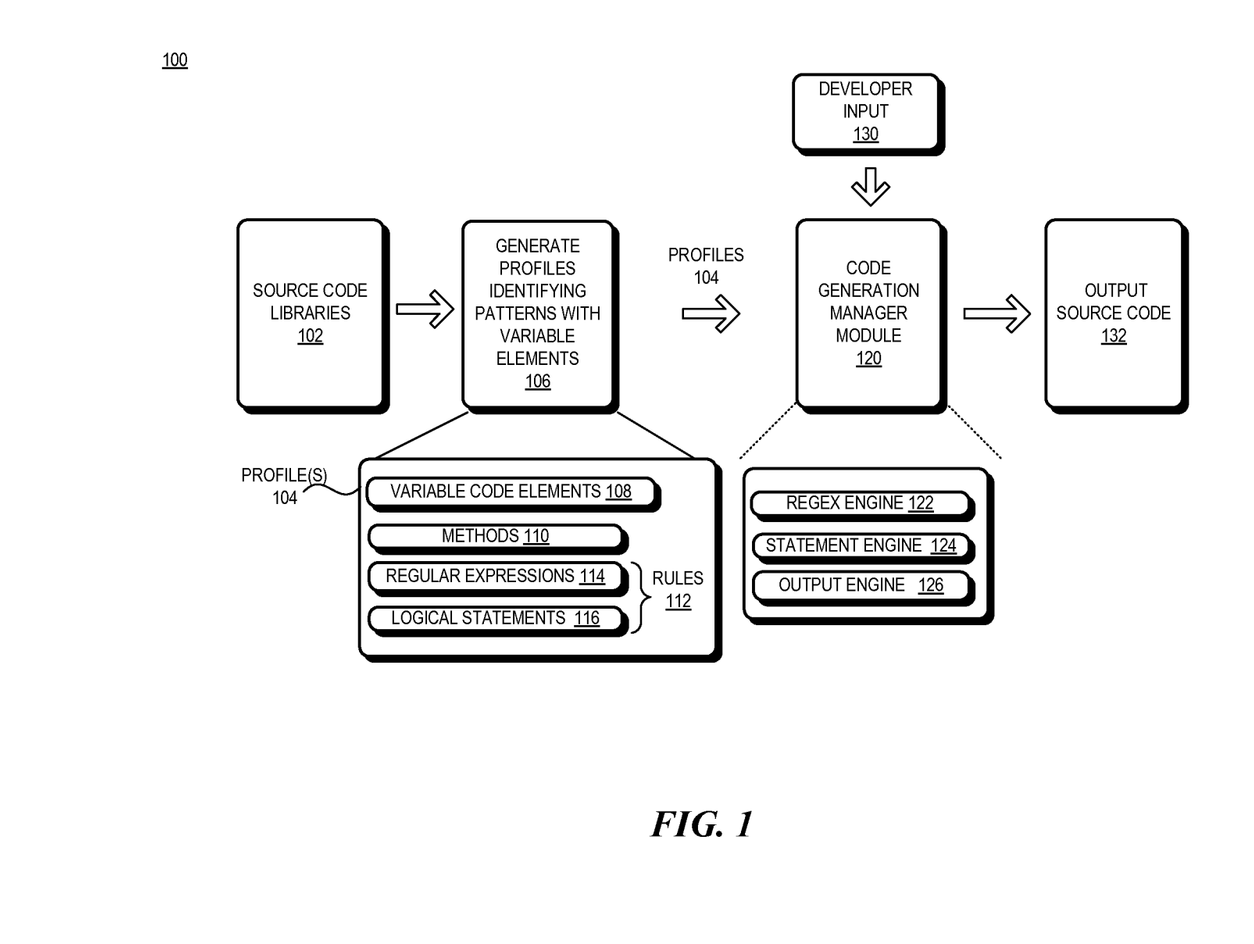
FIG. 1 is a block diagram illustrating an exemplary system for automatic source code generation.

Attention now turns to a discussion of an exemplary system implementing the embodiments of this technology. Turning to FIG. 1, there is shown a system 100 having source code libraries 102, one or more profiles 104 and a code generation manager module 120. Each profile 104 may include one or more variable code elements 108, one or more methods 110, and one or more rules 112. The code generation manager module 120 may include a regular expression or regex engine 122, a statement engine 124, and an output engine 126. The code generation manager module 120 receives developer input 130 that directs the generation of the output source code 132.

In an initial phase of the system 100, the source code libraries 102 are analyzed to identify code elements that may be repeated in different contexts with different values. These code elements are parameterized or modeled so that they can be represented by different source code statements when used in the different contexts. This analysis may start with an existing code base, such as existing source code libraries 102 or other input sources, and determine those portions of the existing code base that differ in different contexts and those portions of the existing code base that remain static. In some embodiments, a developer may utilize other input sources other than source code libraries, such as universal public application programming interfaces (APIs) or source code built into an programming language.

A profile 104 is associated with a particular context and contains the programmable instructions used to generate the output source code (i.e., source code statements) for that context. A profile 104 may include one or more variable code elements 108 that represent elements of the source code that vary. The variable code elements 108 may represent variables, object types, variable names, and other constructs in the grammar of the programming language that is used in the output source code 132. A user may input values of the variable code elements 108 which are then used by the methods 110 to generate the output source code 132.

In some embodiments, a user interface may be used to obtain values for the variable code elements 108. In other embodiments, the profile 104 may include a natural language interface that accepts user input identifying values for the variable code elements 108. The natural language interface may be implemented through one or more rules 112. The rules allow a developer to input the values in a manner that can be more readily understood by the developer. In addition, the rules provide feedback to the developer as to the manner in which the code is structured.

Each rule 112 may include one or more regular expressions 114 and one or more logical statements 116. The rules 112 use one or more regular expressions 114 to match the user's natural language text or text string to identify variable code elements and their user-defined values. The variable code elements 108 are then applied in logical statements 116 to invoke methods 110 that transform the logical statements 116 into the output source code 132.

The code generation manager module 120 utilizes the profiles 104 and developer input 130 to generate the output source code 132. A regex engine 122 parses the natural language text input by a developer to find a rule that best matches the text string. The rule's regular expression is used to extract the variable code elements in the text string. The statement engine 124 incorporates the values of the variable code elements into logical statements which are then used to invoke the appropriate methods 110 to generate the output source code in a developer-specified programming language. The output source code is then formatted and provided to the developer.

In one or more embodiments, the code generation manager module 120, the regex engine 122, the statement engine 124, the output engine 126, and the methods 110 may be a sequence of computer program instructions, that when executed by a processor, causes the processor to perform methods and/or operations in accordance with a prescribed task. The code generation manager module 120, the regex engine 122, the statement engine 124, the output engine 126, and the methods 110 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Although the system 100 as shown in FIG. 1 has a limited number of elements in a certain configuration, it may be appreciated that the system 100 may include more or less elements in alternate configurations as desired for a given implementation.

Figure 2:
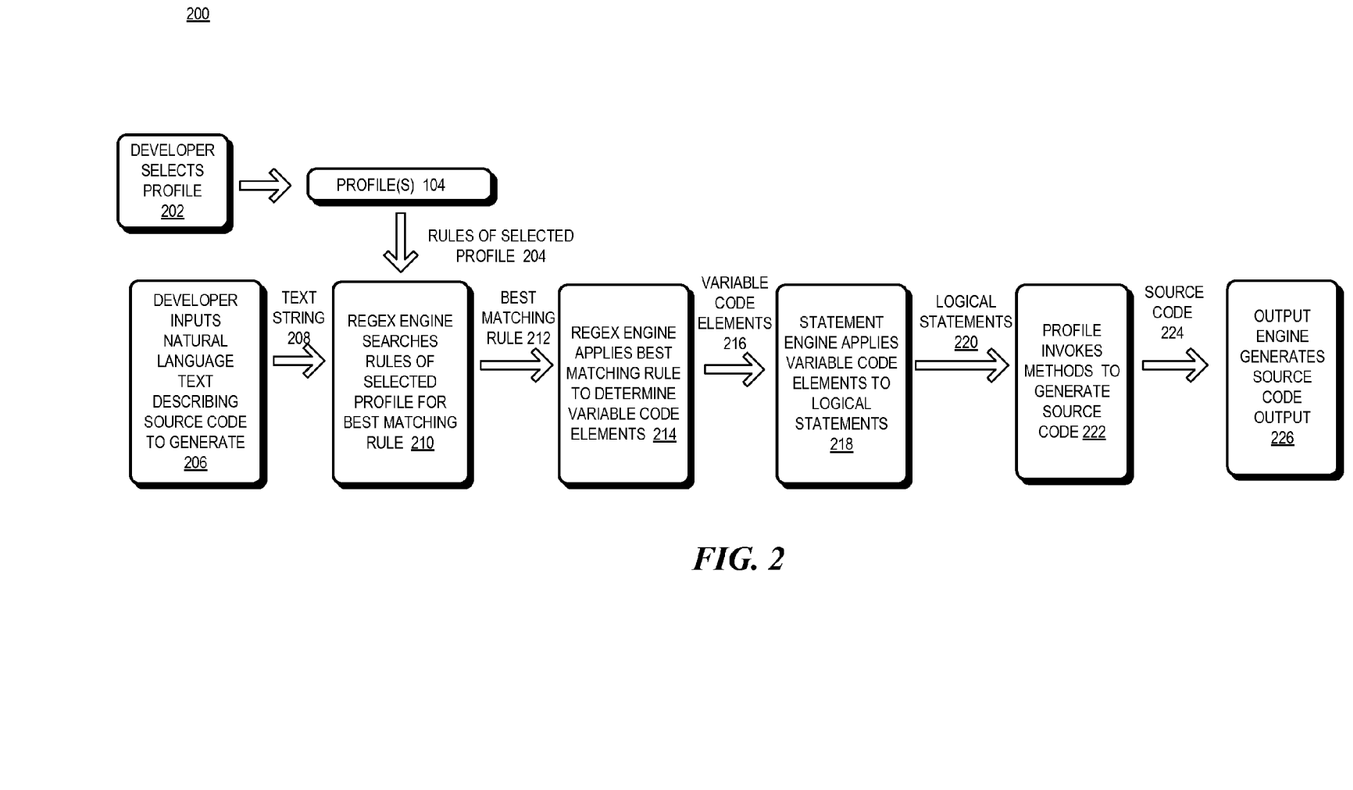
FIG. 2 is a block diagram illustrating a first embodiment of a method for automatically generating source code.

FIG. 2 illustrates a first exemplary method for automatically generating source code. In this embodiment, a developer selects a profile 204 from a set of profiles 104 that matches the context of the output source code (block 202). The developer then inputs a natural language text string 208 to specify the source code statements that are to be generated (block 206). The regex engine uses the text string 208 to search the rules of the selected profile 204 for the best matching rule 212 (block 210). The regex engine parses the text string against each regular expression in the rules to find the regular expression that is the closest match (block 210). The regex engine applies the best matching rule 212 to the text string 208 to determine the variable code elements 216 (block 214).

The values of the variable code elements 216 in the text string are then used by the statement engine to construct logical statements 220 (block 218) which invoke the methods of the profile to generate source code 224 (block 222). The source code 224 is then formatted and output by the output engine (block 226).

Figure 3:
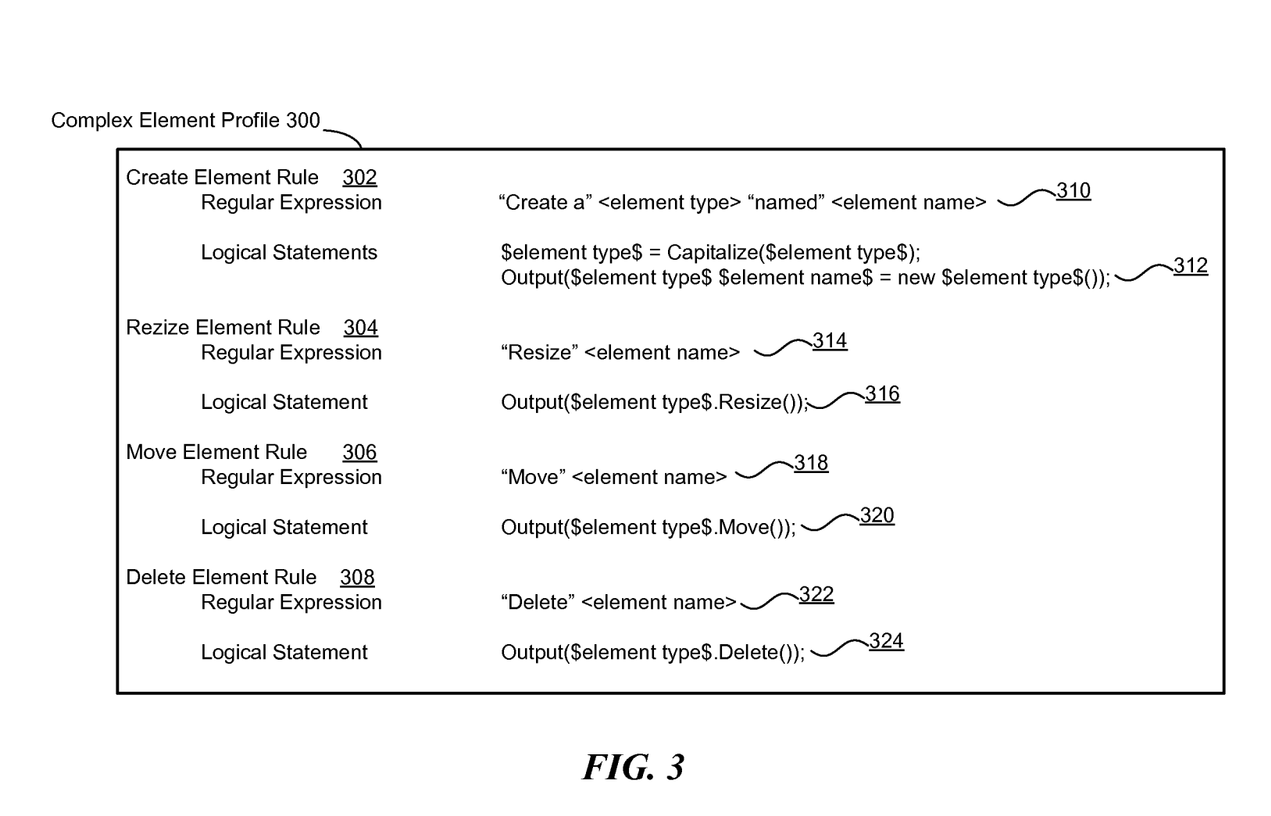
FIG. 3 is a first exemplary profile used to illustrate the first embodiment of the method for automatically generating source code.
Figure 4:
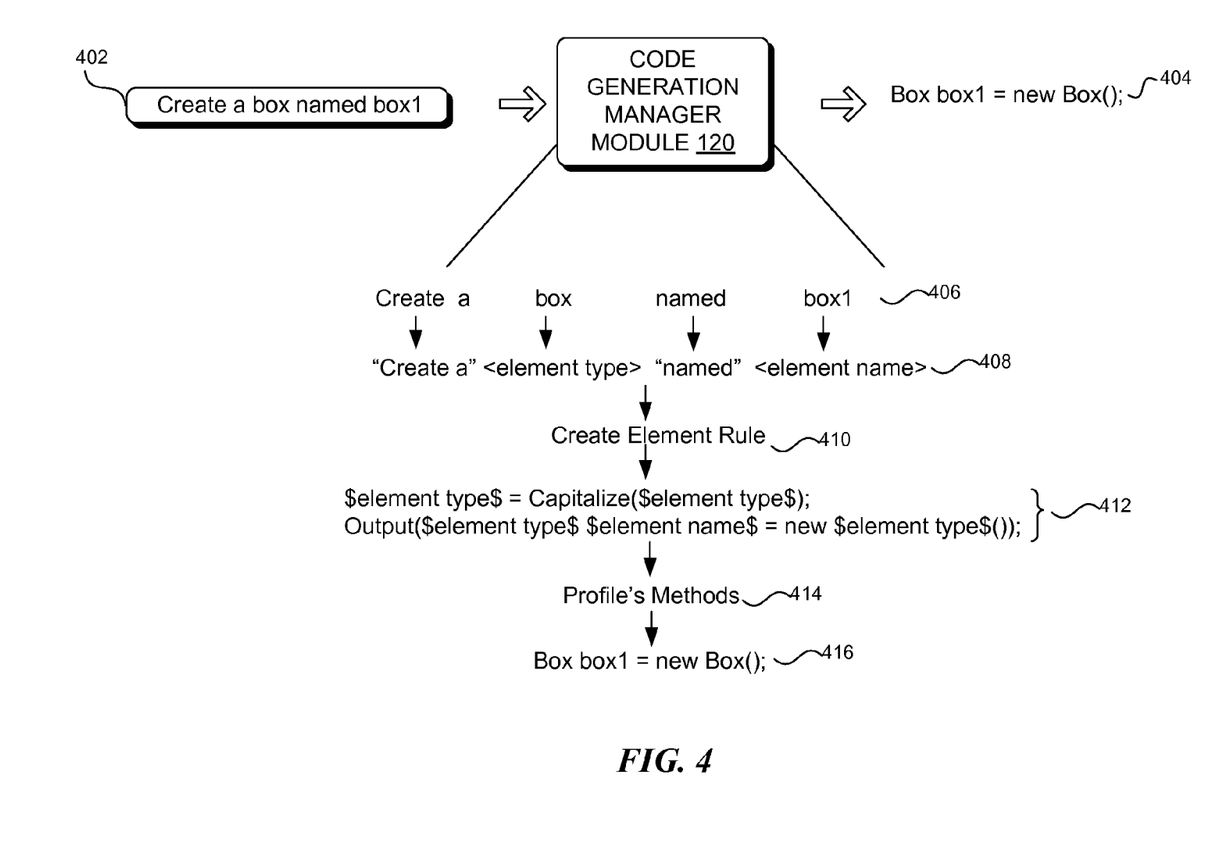
FIG. 4 is an exemplary illustration depicting the first embodiment of the method for automatically generating source code.

FIGS. 3 and 4 depict an exemplary illustration of the automatic code generation using rules. FIG. 3 shows an exemplary complex element profile 300 that is used in FIG. 4 to generate output source code for a graphics application. The graphics application contains source code statements to create a graphics object, resize a graphics object, move a graphics object, and delete a graphics object. The create element rule 302 contains a regular expression 310 and set of logical statements 312 that are used to generate output source code to create a graphic object. The resize element rule 304 contains a regular expression 314 and a logical statement 316 to generate source code to resize a graphic object. The move element rule 306 contains a regular expression 318 and a logical statement 320 used to move a graphic object. The delete element rule 308 contains a regular expression 322 and a logical statement 324 used to delete a graphic object.

FIG. 4 illustrates the generation of the output source code for creating a box-shaped graphic object named box1. In this example, a developer may input a text string describing the source code to be generated. The text string may include the words "Create a box named box1" (blocks 402, 406). The code generation manager module uses the regex engine to parse the text string into tokens which are then matched against the regular expressions of each rule in profile selected by the user. The regex engine matches the natural language text 406 to the regular expression 408 associated with the Create Element Rule 410. Once the regex engine identifies the best matching rule, the regex engine extracts the user-defined values for the variable code elements from the text string. The variable code elements are <element type> and <element name>. The user-defined value for <element type> is "box" and the user-defined value for <element name> is "box1."

The regex engine passes the values of the variable code elements to the statement engine which uses the values in the logical statements associated with the rule (block 414). The methods used in the logical statements are invoked to generate the corresponding output source code (block 416).

Figure 5:
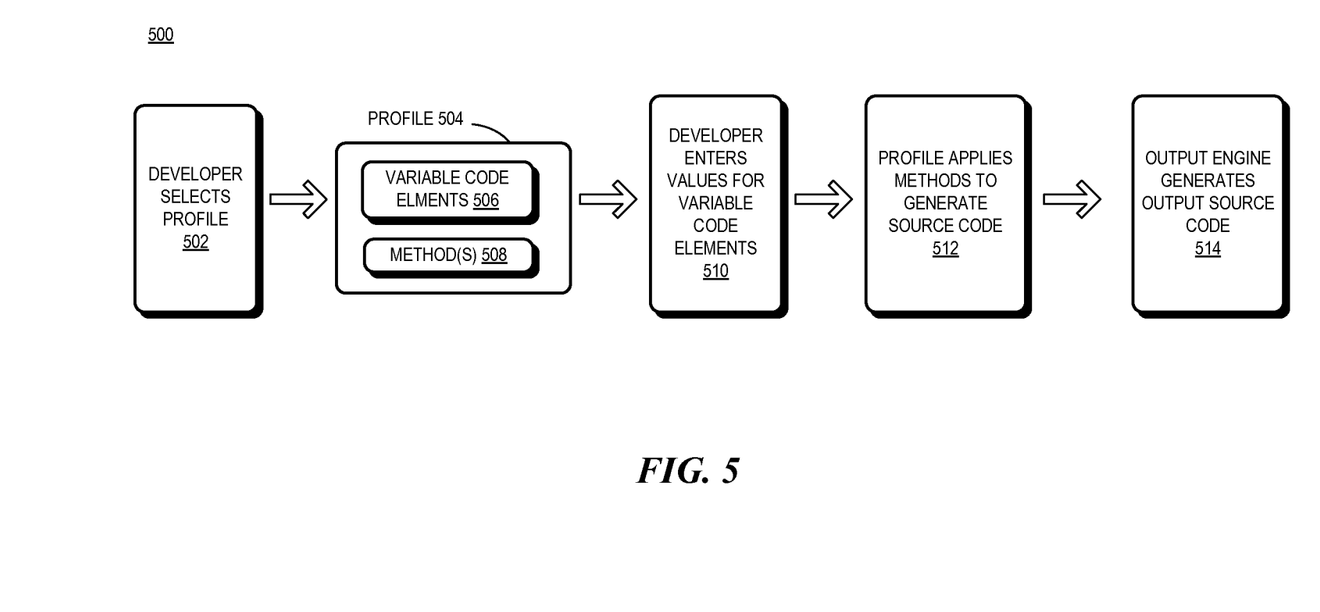
FIG. 5 is a block diagram illustrating a second embodiment of the method for automatically generating source code.

FIG. 5 illustrates the operation of an exemplary method for generating output source code using a profile without rules. A developer selects a profile 504 (block 502) that consists of variable code elements 506 and methods 508. The developer enters values for each of the variable code elements associated with a profile (block 510). The code generation manager module applies the methods in the profile that uses the variable code elements to generate the corresponding source code statements or source code (block 512). The source code is then passed to an output engine which formats the source code in a developer-specified manner which is output to the developer (block 514).

Figure 6:
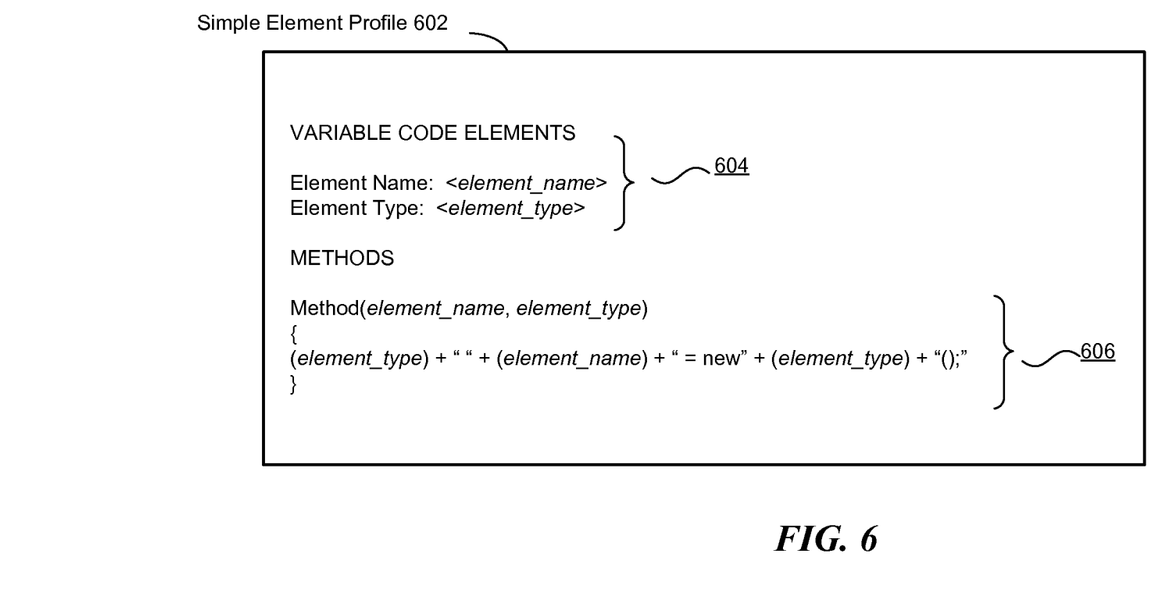
FIG. 6 is a second exemplary profile used to illustrate a second embodiment of the method for generating source code automatically.

FIG. 6 illustrates an exemplary profile 602 having variable code elements and methods. Referring to FIG. 6, there is shown a simple element profile 602 that may be used in a graphics application to construct graphic objects. The simple element profile 602 includes variable code elements 604 and a method 606 associated with profile 602. The variable code elements 604 are <element_name> and <element_type>.

Figure 7:
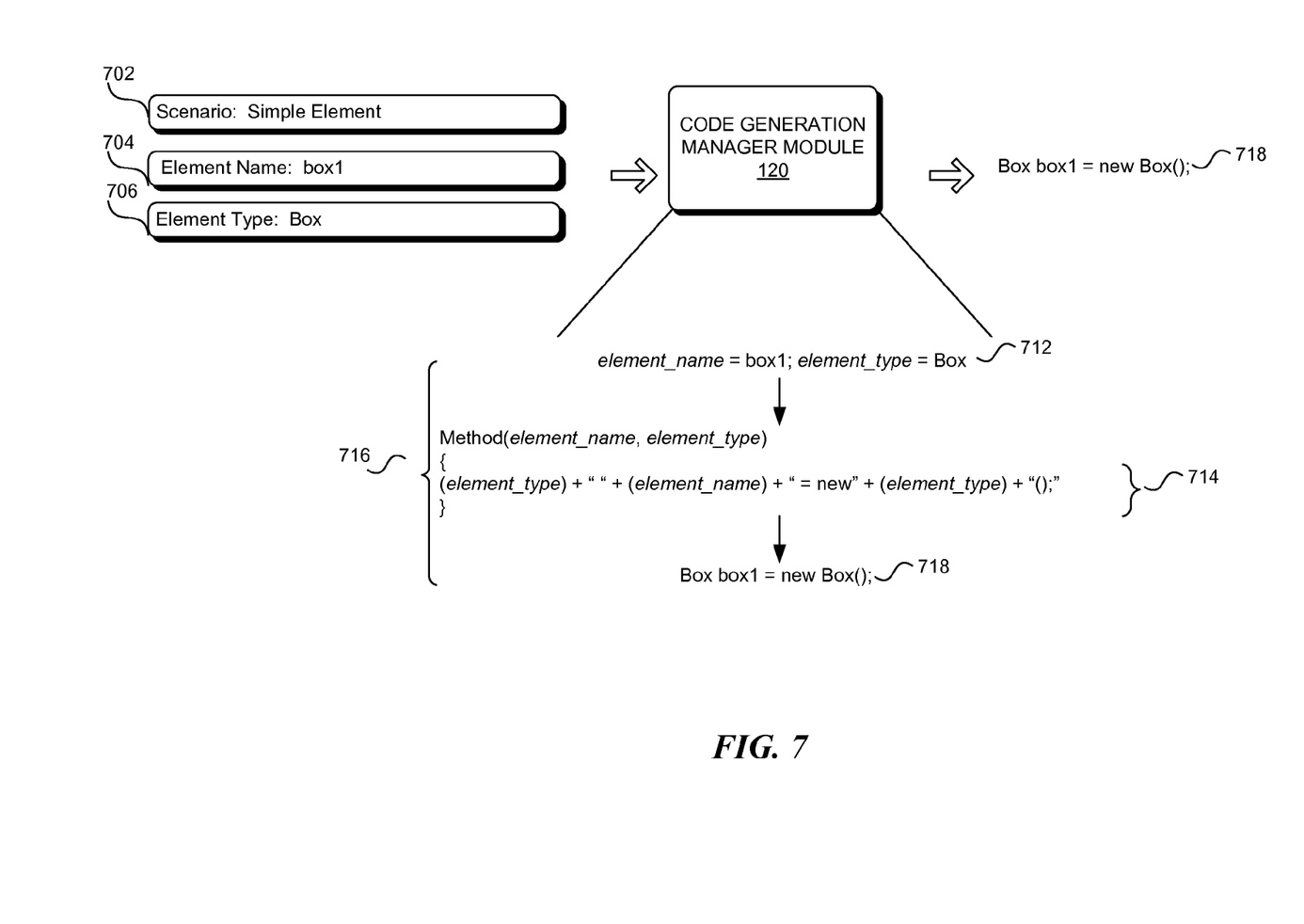
FIG. 7 is an exemplary illustration depicting the second embodiment of the method for automatically generating source code.
Figure 8:
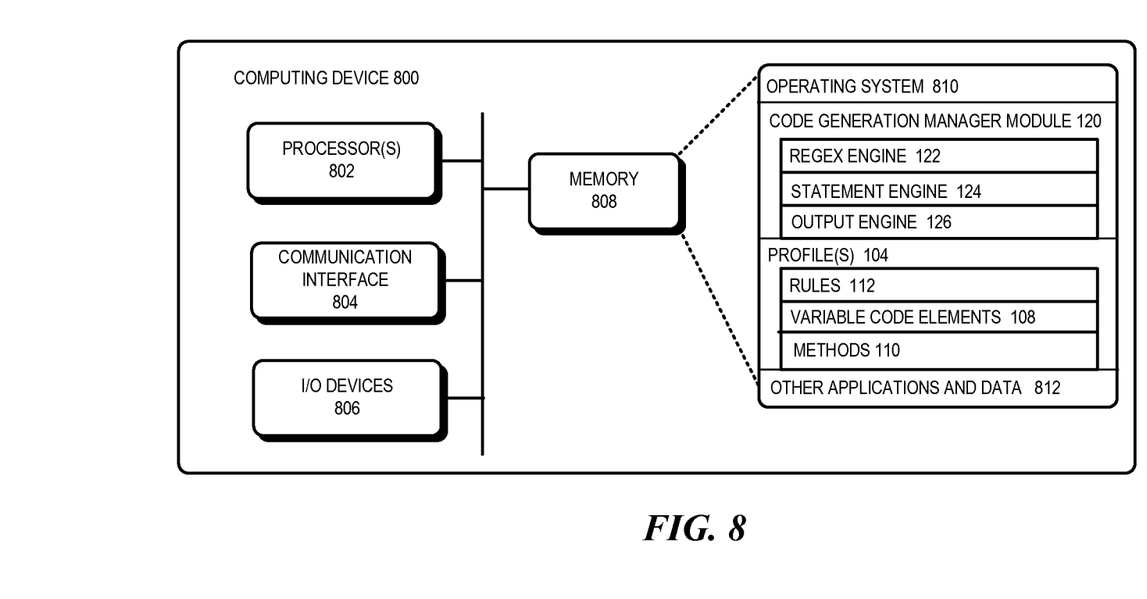
FIG. 8 is a block diagram illustrating an exemplary computing device used an exemplary operating environment.

Referring to FIG. 7, a user interface may be used to obtain the values of the variable code elements. As shown in FIG. 7, the user interface may include a menu having a field 702 for the user to select a profile, a field 704 for the user to select an element name, and a field 706 for the user to select an element type. The code generation management module 120 obtains the values of the variable code elements from the fields in the user interface (block 712). In this example, the value of element_name is "box1" and the value of element_type is "Box." The code generation management module 120 then invokes the method 714 of the profile 716 with the values of the variable code elements to generate the output source code 718 which is Box box 1=new Box ( );

Attention now turns to a discussion of an exemplary operating environment. Referring now to FIG. 8, there is shown a schematic block diagram of an exemplary operating environment including a computing device 800. The computing device 800 may be any type of electronic device, such as, without limitation, a mobile device, a personal digital assistant, a mobile computing device, a tablet, a smart phone, a cellular telephone, a handheld computer, a server, a server array or server farm, a web server, a network server, a blade server, an Internet server, a work station, a minicomputer, a mainframe computer, a supercomputer, a network appliance, a web appliance, a distributed computing system, multiprocessor systems, or combination thereof.

The computing device 800 may have one or more processors 802, a communication interface 804, one or more input/output (I/O) device 806, and a memory 808. A processor 802 may be any commercially available processor and may include dual microprocessors and multi-processor architectures. The communications interface 804 facilitates wired or wireless communications between the computing device 800 and a communication framework. The I/O devices 806 may include a keyboard, mouse, pointing device, microphone, other devices to receive voice input, touch screen input, devices to accept gesture input, and the like.

The memory 808 may be any type of computer-readable storage media or computer-readable storage device that stores executable procedures, applications, and data that does not pertain to propagated signals, such as modulate data signals transmitted through a carrier wave. The memory 808 may be implemented as a memory device (e.g., random access memory, read-only memory, etc.), magnetic storage, volatile storage, non-volatile storage, optical storage, DVD, CD, floppy disk drive, flash drive, and any combination thereof. The memory 808 may also include one or more external storage devices or remotely located storage devices. The memory 808 may contain instructions and data as follows:

an operating system 810;
    a code generation manager module 120 that may include
        a regex engine 122, a statement engine 124, and an output engine 126;
    one or more profiles 104, each profile may include one or
        more rules 112, and includes one or more variable code elements 108, and one or more methods 110; and
    various other applications and data 812.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, the method comprising:

configuring a profile to generate one or more source code statements automatically, the profile including one or more variable code elements, one or more methods, and at least one rule, a variable code element comprising an element of a source code statement that takes on different values in different contexts, individual methods of the one or more methods including programmable instructions that generate the one or more source code statements using values of the variable code elements, the one or more source code statements based on corresponding source code statements from an existing code base of a software application, the at least one rule is used to match syntax of a text string to determine one or more variable code elements, the at least one rule includes one or more regular expressions and/or one or more logical statements, the one or more regular expressions used to match syntax of the text string to a rule, the one or more logical statements used to invoke one or more of the methods to generate the one or more source code statements;

searching for a rule that closely matches the syntax of the text string;

using a regular expression associated with the closely matching rule to obtain the one or more variable code elements;

obtaining values for the variable code elements;

applying the values of the variable code elements in the logical statements to invoke methods to generate the one or more source code statements.

2. The computer-implemented method of claim 1, wherein the profile is selected by a developer from a plurality of profiles, at least one profile is associated with a select context.

3. The computer-implemented method of claim 2, wherein the context is associated with a programming environment of output source code statements.

4. The computer-implemented method of claim 1, wherein the values of the variable code elements are input through a user interface.

5. The computer-implemented method of claim 4, wherein the user interface includes a natural language interface.

6. The computer-implemented method of claim 1, wherein the context is associated with one or more of a programming language, code library, code guideline, best practice, formatting preference, and/or application.

7. The computer-implemented method of claim 1, wherein the existing code base includes source code libraries having test cases used to test software applications under different conditions.

8. A device, comprising:
at least one processor and a memory;
the memory including:
a profile including one or more variable code elements, one or more methods, and at least one rule, at least one variable code element associated with an element of the source code that takes on different values, at least one method used to generate at least one source code statement using at least one value of the at least one variable code element, the at least one source code statement based on corresponding source code statements from an existing code base, the at least one rule used to match syntax of a text string to determine one or more variable code elements, the at least one rule includes one or more regular expressions and/or one or more logical statements, the one or more regular expressions used to match syntax of a text string to a rule, the one or more logical statements used to invoke one or more of the methods to generate the one or more source code statements; and
a first set of instructions, that when executed on the at least one processor, searches for a rule that closely matches the syntax of a text string, uses a regular expression associated with the closely matching rule to obtain the one or more variable code elements, obtains values for the variable code elements, applies the values of the variable code elements to the logical statements to invoke one or more methods that generate the one or more source code statements.

9. The device of claim 8, wherein the profile is associated with a context, the context including a programming environment of output source code statements.

10. The device of claim 8, the memory including a user interface that accepts values of the variable code elements.

11. The device of claim 8, wherein the context is associated with one or more of a programming language, code library, code guideline, best practice, formatting preference, and/or application.

12. The device of claim 8, wherein the values of the variable code elements are user-defined.

13. The device of claim 8, wherein the existing code base includes a source code library having one or more test cases.

14. The device of claim 8, wherein the memory further comprises:
a second set of instructions, that when executed on the at least one processor, configures the profile from an analysis of the existing code base with respect to portions of the existing code base that differ in different contexts and portions of the existing code base that remain static.

15. A computer-implemented system, comprising:
at least one processor and a memory;
the at least one processor configured to:
obtain a profile, the profile including one or more variable code elements, at least one rule, and one or more methods, at least one variable code element associated with an element of the source code that takes on different values, at least one method used to generate the one or more source code statements using at least one value for the at least one variable code element, the one or more source code statements based on corresponding source code statements from an existing code base, the at least one rule is used to match syntax of a text string to determine one or more variable code elements, the at least one rule includes one or more regular expressions and/or one or more logical statements, the one or more regular expressions used to match syntax of a text string to a rule, the one or more logical statements used to invoke one or more of the methods to generate the one or more source code statements;
search for a rule that closely matches syntax of a text string;
employ a regular expression associated with the closely matching rule to obtain the one or more variable code elements;
obtain values for the variable code elements; and
apply the values of the variable code elements in the logical statements to invoke one or more methods that generate the one or more source code statements.

16. The computer system of claim 15, wherein the at least one processor is further configured to accept values of the variable code elements from a user interface.

17. The computer system of claim 15, wherein the profile is associated with a context, the context is associated with one or more of a programming language, code library, code guideline, best practice, formatting preference, and/or application.

18. The computer system of claim 15, wherein the values of the variable code elements are user-defined.

19. The computer system of claim 15, wherein the existing code base includes a source code library having one or more test cases used to test a software application.

20. The computer system of claim 15, wherein the at least one processor is further configured to:
analyze the existing code base to find portions that differ in different contexts and portions that remain static; and
configure the profile to identity those portions that differ in different contexts as variable code elements.

* * * * *